Patented Feb. 16, 1932

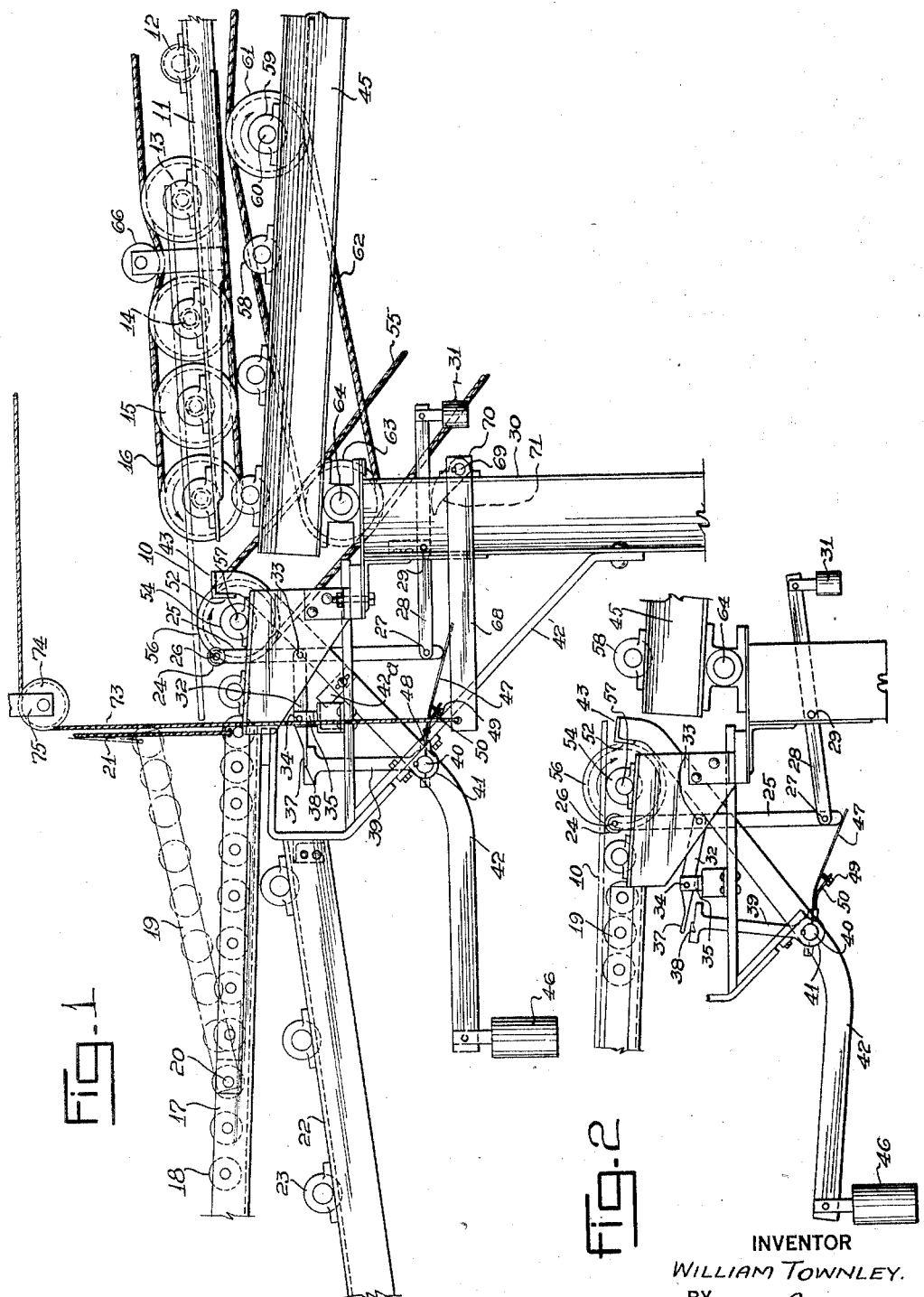

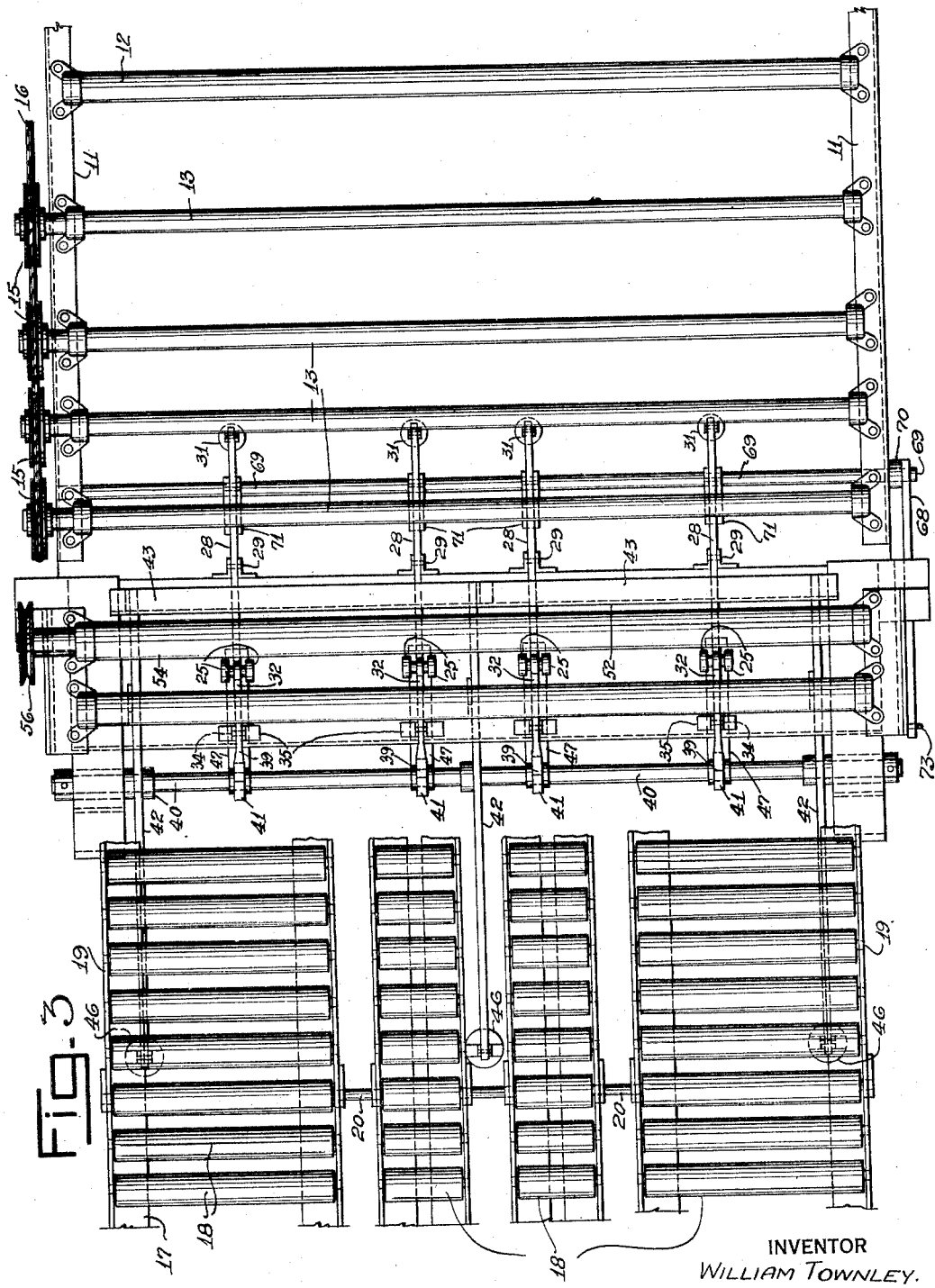

1,845,974

UNITED STATES PATENT OFFICE

WILLIAM TOWNLEY, OF FORT DODGE, IOWA, ASSIGNOR TO UNITED STATES GYPSUM COMPANY, OF CHICAGO, ILLINOIS, A CORPORATION OF ILLINOIS

BOARD HANDLING MACHINE

Application filed December 9, 1929. Serial No. 412,725.

This invention relates to an apparatus for handling board, or other flat structural elements and has reference more particularly to an apparatus suitable for changing the direction of movement of plaster boards in their travel from the setting conveyor to the distributing conveyor.

It is standard practice in the manufacture of boards for building purposes, such as plaster boards, wallboards, fiber boards and the like, to form said boards on a conveyor, cut the boards to predetermined lengths and then pass said boards through continuous drying kilns for the purpose of reducing the moisture content thereof. Commercial gypsum boards and the like, are usually made with a core of set gypsum faced on each surface with a layer of heavy paper. In order to reduce the floor space required in manufacture and especially the length of the drying kiln, it is the practice to make the drying kilns of sufficient width so that several boards abreast can pass through said drying kilns simultaneously. It is also the practice to have the drying kilns located underneath the setting conveyor on which the gypsum core is allowed to set to solid form so as to economize on floor space, with the result that the direction of movement of the plaster board must be reversed to transfer same from the setting conveyor to the drying kiln. Furthermore, since the gypsum boards are often produced in two or more lines, it is desirable to have a mechanism for forming these boards several abreast on the conveyor prior to entering the kiln, and then to release all of the boards simultaneously for further movement along the distributing conveyor and into the kiln as a body.

An object of this invention therefore, is to provide a mechanism operated mechanically for forming several gypsum boards abreast upon a conveyor prior to entering the drying kiln; also to improve board handling apparatus in other respects hereinafter specified and claimed.

Reference is to be had to the accompanying drawings forming a part of this specification, in which, Fig. 1 is a fragmentary, side elevation of the board handling mechanism in one position, Fig. 2 is a view similar to Fig. 1 but with the mechanism in a second position, and Fig. 3 is a plan view of the mechanism.

According to the standard practice, the gypsum or other building boards 10, pass along a setting conveyor 11, or other suitable conveyor, where the gypsum core material is allowed to set to solid form. This conveyor 11 may be in the form of a roller conveyor having rollers 12 along which the boards travel under the action of gravity, the conveyor 11 being usually inclined at an angle to the horizontal. If desired, the rollers 12 may be positively driven so as to cause the positive forward movement of the boards at all times. Driven rollers 13 are mounted on shafts 14 which have pulleys 15 secured thereto, said pulleys being driven in any suitable way, such as by a flexible belt 16. Any source of power may be provided for causing the rotation of the driven rollers 13, such as an electric motor, not shown, which is arranged in operative relation to the flexible belt 16.

As the boards 10 leave the conveyor 11, they are received by an inclined conveyor 17 having rollers 18 for permitting the movement of the boards. The rollers 18 are rotatably mounted on the conveyor 17 and the forward end of conveyor 17 has a tilting section 19 which is pivotally mounted upon the conveyor 17 by means of a pin 20. A rope or cable 21 is attached to the forward end of the tilting section 19, said rope leading to some point convenient to the reach of the operator. If a damaged board passes along the conveyor 11, the operator elevates the tilting frame 19 to the dotted position shown in Fig. 1, so that the board continues downwardly along a discharge conveyor 22 having rollers 23, said latter conveyor delivering the waste board to any suitable discharge point.

As the board 10 moves onto the conveyor 17, the right hand edge of said board, as seen in Fig. 1, falls from the end roller 13 onto a roller 24 which is rotatably mounted on the upper end of a trip member, such as a rod 25 by means of a pin 26. The lower end of rod 25 is pivotally connected by means of pin 27 to a lever 28, the latter being pivotally and adjustably supported by means of pin 29 on a vertical standard or support 30. The outer end of lever 28 has a weight 31 pivotally secured thereto for the purpose of counterbalancing the weight of rod 25 and connected devices. Intermediate the ends of the rod 25, a lever 32 is pivotally connected by means of pin 33. The lever 32 is pivotally supporting intermediate its ends by means of a pin 34 which is secured on a bracket 35 also secured to the framework of the machine.

The arm of lever 32 opposite the pin 33 is formed into a latch 37 which is so shaped as to engage behind a catch shoulder 38 formed on a lever 39. The lever 39 is secured to a rock shaft 40 which is rotatably mounted in suitable bearing brackets 41 secured to framework 42'. Arranged along the shaft 40 and rigidly secured thereto, are a plurality of levers 42, which may be three in number as shown in Fig. 3. To the upper ends of levers 42 is secured a transversely extending angle bar 43 which normally lays in the path of travel of the boards 10 as they move down the inclined conveyor 17. The bar 43 thus acts as a stop to arrest the movement of the boards down conveyor 17 until a predetermined number of boards have lined up abreast, at which time the lever 42 moves in a clockwise direction to release all of the boards simultaneously for further movement down the conveyor 17, onto a distributing conveyor 45. The counter-clockwise movement of levers 42 is limited by adjustable stop 42a. Each of the levers 42 is provided with a pivotally mounted counterweight 46. A plurality of flat springs 47 are secured to suitable collars 48, said collars being secured along the shaft 40. An adjusting screw 49 operates through a bracket 50 to adjust the tension of each of the springs 47 as it bears against the lower end of each of the rods 25.

As seen in Fig. 3 the conveyors 11 and 17 are both of considerable width so that several lines of plaster boards may travel along said conveyors and eventually line up abreast behind a downstanding leg 52 of angle bar 43. A number of the rollers 24 with associated mechanisms are arranged transversely of the conveyors, said rollers being adapted to be engaged successively by the various boards as they travel along said conveyors. The weight 46 is superior in effect to the weight of any number of boards less than a predetermined number and is also superior to the tension of any number of individual springs 47 less than the complete number. However, when the boards are lined up abreast across the full width of the bar 43, the last of the rollers 24 is depressed by the last board to come into position so that the last latch 37 is disengaged from catch shoulder 38, thus permitting the shaft 40 to rotate in a clockwise position and disengage the bar 43 from the forward edge of the board and permit the simultaneous forward movement of all of the boards along conveyor 45.

As the rollers 24 are depressed by the weight of the boards, the boards move downwardly onto a driven roller 54 which is caused to rotate in a clockwise direction as seen in Fig. 1 by means of a flexible belt 55 passing around a pulley 56, the latter being secured to a shaft 57 which carries the roller 54. Thus the friction of the roller 54 on the forward end of the boards causes the boards to move to the right as seen in Fig. 1 and onto rollers 58 which are rotatably mounted on the distributing conveyor 45. Some of the rollers 59 on the conveyor 45 are mounted upon shafts 60, pulleys 61 being also secured to said shafts and being connected by flexible belt 62 to pulley 63 secured to a countershaft 64. The belt 55 leading from the motor not shown causes the rotation of the countershaft 64. The distributing conveyor 45 is pivotally mounted at its upper end on the countershaft 64 so that it can be rocked vertically within certain limits by a mechanism not shown, so as to distribute the plaster boards to different decks of a multi-decked drying kiln as is well known in the art. Various belt tightener pulleys 66 may be provided at suitable intervals along the flexible belts so as to maintain said belts under tension and to prevent slippage around the pulleys.

Under certain conditions it is desirable to have the rollers 24 and the associated mechanism rendered inoperative by lowering said rollers out of the path of travel of the boards. For this purpose a lever 68 is secured to a transversely extending shaft 69 which is rotatably mounted for rocking movement in bearing brackets 70 secured to the framework 30. A plurality of cams 71 are secured to the shaft 69, one cam being arranged below each of the levers 28. The opposite end of lever 68 is connected by a rope or cable 73 to any suitable control means not shown, within the convenient reach of the operator, said cable passing around one or more pulleys 74 rotatably supported on suitable rigid brackets 75.

In operation, the boards 10 pass along the rollers 13 and roller conveyor 11 onto the rollers 18 and conveyor 17, where the direction of movement of the boards is reversed and the boards start moving to the right as seen in Fig. 1 until their forward edge abuts against the downstanding leg 52 of angle bar 43 until a predetermined number of boards have lined up abreast. The boards engaging the leg 52 are normally held out of engagement with the drive roller 54 by the upward thrust of rollers 24 and springs 47. When the last board engages the last roller 24, the last latch 37 is disengaged from the catch 38 and shaft 40 moves in a clockwise direction, thus lowering bar 43 and permitting all of the boards to engage the drive rollers 54 and be moved to the right onto the rollers 58 of distributing conveyor 45. The distributing conveyor 45 is rocked about shaft 64 by a mechanism not shown, so as to deliver the boards to the proper deck of a multi-decked drying kiln. After the boards have been disengaged from rollers 24 by passing to the right, lever 42 moves in a counter-clockwise direction limited by adjustable stop 42a so that all the latches 37 again engage behind the catch shoulders 38 and the mechanism is again set for receiving a new lot of boards.

When a damaged board passes along the conveyor 11, cable 73 is pulled by the operator thus causing the depression of all of rollers 24 and the bar 43 so that all the boards ahead of the damaged board pass directly from conveyor 17 onto conveyor 45 without being held up by the bar 43. As the damaged board comes along, the operator pulls on cable 21 and elevates the pivoted conveyor section 19 so that the damaged board tilt about the lowest roller 13 and passes downwardly along conveyor 22 to a suitable point of discharge.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. In a board handling mechanism, a conveyor adapted to move boards along a predetermined path, an arresting member associated with said conveyor adapted to stop the movement of said boards until a plurality of boards have been lined up abreast on said conveyor, a plurality of rollers arranged transversely on said conveyor and adapted to be actuated successively by boards moving along said conveyor, and connecting means between said rollers and said arresting member adapted to release said member from said boards when the last of said rollers have been actuated so that said boards continue moving along said conveyor.

2. In a board handling mechanism, a setting conveyor, a reversing conveyor, a third conveyor, a plurality of trip members associated with said conveyors, an arresting member connected with said trip members and extending transversely of said conveyors said arresting member being adapted to stop the movement of boards from the reversing conveyor to said third conveyor until a predetermined number of boards have been lined up abreast behind said arresting member, said trip members being successively actuated by said boards the last of said boards being arranged to actuate the last of said trip members and thus act through said connecting means to release said arresting member from said boards and permit the continued movement of said boards from the setting conveyor to the third conveyor.

3. In a board handling mechanism, a pair of conveyors, a plurality of trip members associated with said conveyors, said trip members being adapted to be successively depressed by the weight of the boards passing along said conveyors, yielding means for normally maintaining said trip elements in an elevated position, an arresting member associated with said conveyors and adapted to line up several boards abreast across said conveyor, and connecting means between said trip members and said arresting member arranged to move the arresting member out of the path of travel of said boards when the last of said trip members is actuated by a board.

4. In a board handling mechanism, a pair of conveyors arranged to move boards from one position to a second position, an arresting member movably positioned transversely of said conveyors and adapted to prevent the movement of said boards from the first conveyor to the second conveyor, a series of trip members associated with said conveyors and adapted to be successively actuated by boards so as to release said arresting member from said boards and permit the movement of said boards from the first to the second conveyor, and yielding means adapted to return the arresting member to normal arresting position after the passing of said boards.

5. In a board handling mechanism, a pair of conveyors adapted to move boards from one position to another position, an arresting member positioned transversely of said conveyors and adapted to line up several boards abreast on the first of said conveyors, a plurality of trip members associated with said arresting members and adapted to be successively actuated by said boards, connecting means between said trip members and said arresting member, the actuation of the last of said trip members being adapted to act through said connecting means and cause said arresting members to be disengaged from said boards to permit the movement of said boards from said first conveyor to the second conveyor, and manual means for rendering said trip members operative.

6. In a board handling mechanism, a reversing conveyor adapted to receive a board moving in one direction and reverse the direction of movement of said board, a second conveyor, an arresting member between said conveyors, a pivotally mounted lever supporting said arresting member, manual means for moving said arresting member out of the path of travel of said board, a movable section in said reversing conveyor, and manual means for actuating said movable section to permit the discharge of defective boards to a discharge point.

7. In a board handling mechanism, a pair of conveyors, a drive roller associated with said conveyors, an arresting member extending transversely of said conveyors near said roller, a plurality of trip members associated with said roller and adapted to be depressed by the weight of boards thereon, said trip members being adapted to yieldingly support said boards out of contact with said drive roller, and connecting means between said trip elements and said arresting member adapted to release said arresting member from said boards when the last of said trip elements has been actuated by a board, said trip elements being adapted to lower all of said boards into contact with said drive rollers when said arresting member is released so as to cause the movement of said boards from the first conveyor to the second conveyor.

8. In a board handling mechanism, a pair of conveyors, an arresting member extending transversely of said conveyors, said arresting member being adapted to line up a plurality of boards abreast across the first of said conveyors, a series of trip elements associated with said arresting member so as to release said arresting member from said boards when a predetermined number of boards have lined up abreast on said first conveyor and manual means for rendering operative the tripping means and inoperative the arresting member when a damaged board is to be delivered to a separate discharge point.

WILLIAM TOWNLEY.